(12) United States Patent
Creamer et al.

(10) Patent No.: US 7,552,225 B2
(45) Date of Patent: Jun. 23, 2009

(54) ENHANCED MEDIA RESOURCE PROTOCOL MESSAGES

(75) Inventors: Thomas E. Creamer, Boca Raton, FL (US); Victor S. Moore, Boynton Beach, FL (US); Wendi L. Nusbickel, Boca Raton, FL (US); Ricardo Dos Santos, Boca Raton, FL (US); James J. Sliwa, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 1029 days.

(21) Appl. No.: 10/833,472

(22) Filed: Apr. 28, 2004

(65) Prior Publication Data

US 2005/0243981 A1    Nov. 3, 2005

(51) Int. Cl.
| | |
|---|---|
| G06F 15/16 | (2006.01) |
| G10L 19/02 | (2006.01) |
| H04W 72/00 | (2009.01) |
| H04M 1/64 | (2006.01) |
| H04L 12/66 | (2006.01) |
| H04L 12/28 | (2006.01) |
| H04L 12/56 | (2006.01) |
| G06F 3/00 | (2006.01) |
| G06F 13/00 | (2006.01) |
| G06F 9/44 | (2006.01) |
| G06F 9/46 | (2006.01) |
| G10L 19/00 | (2006.01) |
| G10L 21/00 | (2006.01) |
| G10L 17/00 | (2006.01) |
| H04M 11/00 | (2006.01) |
| H04M 3/00 | (2006.01) |
| H04M 5/00 | (2006.01) |

(52) U.S. Cl. ............... 709/230; 709/218; 709/227; 709/236; 709/245; 709/249; 704/203; 704/270.1; 704/275; 704/277; 379/88.13; 379/88.17; 379/93.15; 379/265.09; 370/352; 370/389; 455/453

(58) Field of Classification Search .......... 709/203, 709/218, 227–231, 236, 245, 249; 704/201, 704/203, 246, 270.1, 275, 277; 719/313; 455/452.2, 453; 379/88.01–88.04, 88.13, 379/88.17, 93.08, 93.15, 265.09; 370/352, 370/389
See application file for complete search history.

(56) References Cited

U.S. PATENT DOCUMENTS 5,864,607 A    1/1999    Rosen et al.
(Continued)

OTHER PUBLICATIONS

Shanmugham, S. et al. "A Media Resource Control Protocol (MRCP) Developed by Cisco, Nuance, and Speechworks," RFC 4463, Apr. 2006, pp. 1-86.*
(Continued)

*Primary Examiner*—Larry D Donaghue
*Assistant Examiner*—Melvin H Pollack
(74) *Attorney, Agent, or Firm*—Novak Druce + Quigg

(57) ABSTRACT

A communication system can include a telephony application server and at least one speech engine, where the system uses a standardized messaging protocol that specifies a standard for media resources. The telephony application server can have at least one voice server component. The speech engines can be allocated to handle requests for the voice server component on a per turn basis. The standardized messaging protocol can define a message format for request messages sent from the voice server component to a selected speech engine, a message format for response messages sent from the speech engine to the voice server component, and a message format for event messages sent from the speech engine to the voice server component. Each message format can include a field for a call identifier.

5 Claims, 2 Drawing Sheets

U.S. PATENT DOCUMENTS

| | | | |
|---|---|---|---|
| 5,978,450 A | 11/1999 | McAllister et al. | |
| 6,169,795 B1 | 1/2001 | Dunn et al. | |
| 6,301,480 B1 * | 10/2001 | Kennedy et al. | 455/445 |
| 6,437,620 B1 | 8/2002 | Singor | |
| 6,480,601 B1 | 11/2002 | McLaughlin | |
| 6,574,480 B1 | 6/2003 | Foladare et al. | |
| 6,785,654 B2 * | 8/2004 | Cyr et al. | 704/270.1 |
| 6,822,957 B1 * | 11/2004 | Schuster et al. | 370/389 |
| 6,842,767 B1 * | 1/2005 | Partovi et al. | 709/203 |
| 6,865,536 B2 * | 3/2005 | Jochumson | 704/270.1 |
| 6,934,756 B2 * | 8/2005 | Maes | 709/227 |
| 6,961,776 B1 * | 11/2005 | Buckingham et al. | 709/229 |
| 6,970,915 B1 * | 11/2005 | Partovi et al. | 709/217 |
| 7,003,087 B2 * | 2/2006 | Spencer et al. | 379/211.01 |
| 7,003,464 B2 * | 2/2006 | Ferrans et al. | 704/270.1 |
| 7,043,004 B1 * | 5/2006 | Khuc et al. | 379/265.01 |
| 7,054,818 B2 * | 5/2006 | Sharma et al. | 704/270 |
| 7,149,287 B1 * | 12/2006 | Burger et al. | 379/88.17 |
| 7,174,294 B2 * | 2/2007 | Schmid et al. | 704/231 |
| 7,215,663 B1 * | 5/2007 | Radulovic | 370/356 |
| 7,260,535 B2 * | 8/2007 | Galanes et al. | 704/270 |
| 7,281,051 B2 * | 10/2007 | Whynot et al. | 709/229 |
| 7,283,964 B1 * | 10/2007 | Geilhufe et al. | 704/277 |
| 7,302,392 B1 * | 11/2007 | Thenthiruperai et al. | 704/251 |
| 7,324,443 B2 * | 1/2008 | Chuah et al. | 370/230 |
| 7,324,947 B2 * | 1/2008 | Jordan et al. | 704/275 |
| 7,340,043 B2 * | 3/2008 | Crockett et al. | 379/88.17 |
| 7,363,228 B2 * | 4/2008 | Wyss et al. | 704/275 |
| 7,386,449 B2 * | 6/2008 | Sun et al. | 704/270.1 |
| 7,392,185 B2 * | 6/2008 | Bennett | 704/243 |
| 7,403,768 B2 * | 7/2008 | Bedingfield et al. | 455/414.1 |
| 7,457,397 B1 * | 11/2008 | Saylor et al. | 379/88.17 |
| 2005/0021826 A1 * | 1/2005 | Kumar | 709/232 |
| 2005/0033852 A1 * | 2/2005 | Tenhunen | 709/229 |
| 2005/0043952 A1 * | 2/2005 | Sharma et al. | 704/270.1 |
| 2005/0065790 A1 * | 3/2005 | Yacoub | 704/231 |
| 2005/0129191 A1 * | 6/2005 | Kokko et al. | 379/88.13 |
| 2005/0177371 A1 * | 8/2005 | Yacoub et al. | 704/270.1 |
| 2005/0220095 A1 * | 10/2005 | Narayanan et al. | 370/389 |
| 2006/0155864 A1 * | 7/2006 | Izumi | 709/230 |

OTHER PUBLICATIONS

Falstrom, P. and Mealling, M. "The E.164 to Uniform Resource Identifiers (URI) Dynamic Delegation Discovery System (DDDS) Application (ENUM)," RFC 3761, Apr. 2004, pp. 1-18.*

Mealling, M. and Denenberg, R. "Report from the Joint W3C/IETF URI Planning Interest Group: Uniform Resource Identifiers (URIs), URLs, and Uniform Resource Names (URNs): Clarifications and Recommendations," RFC 3305, Aug. 2002, pp. 1-11.*

Campbell, B. and Sparks, R. "Control of Service Context using SIP Request-URI," RFC 3087, Apr. 2001, pp. 1-39.*

Lennox, Jonathan Michael. "Services for Internet Telephony," Doctorate Thesis, Columbia University, 2004, pp. 1-226.*

Schulzrinne, H. et al. "Real Time Streaming Protocol (RTSP)," RFC 2326, Apr. 1998, pp. 1-92.*

Johnston, A. et al. "Session Initiation Protocol (SIP) Public Switched Telephone Network (PSTN) Call Flows," RFC 3666, Dec. 2003, pp. 1-118.*

Charlton, N. et al. "User Requirements for the Session Initiation Protocol (SIP) in Support of Deaf, Hard of Hearing and Speech-Impaired Individuals," RFC 3351, Aug. 2002, pp. 1-17.*

Schulzrinne, Henning G. and Rosenberg, Jonathan D. "The Session Initiation Protocol: Providing Advanced Telephony Services Across the Internet," Bell Labs Technical Journal, vol. 3, Issue 4, Aug. 14, 2002, pp. 144-160.*

Goode, Bur. "Voice Over Internet Protocol (VoIP)," Invited Paper, Proceedings of the IEEE, vol. 90, No. 9, Sep. 2002, pp. 1495-1517.*

Schmandt, C. and McKenna, M.A. "An Audio and Telephone Server for Multi-Media Workstations," Proceedings of teh 2nd IEEE Conference on Computer Workstations, Mar. 7-10, 1998, pp. 150-159.*

Schulzrinne, H. and Rosenberg, J. "The IETF Internet Telephony Architecture and Protocols," IEEE Network, vol. 13, Issue 3, May/Jun. 1999, pp. 18-23.*

Huitema, C. et al. "An Architecture for Residential Internet Telephony Service," IEEE Internet Computing, vol. 3, Issue 3, May/Jun. 1999, pp. 73-82.*

Shanmugham, S., et al., "A Media Resource Control Protocol Developed by Cisco, Nuance, and Speechworks", Internet Engineering Task Force, Jan. 1, 2004.

* cited by examiner

100

105 —— generic-message = enhanced start-line
enhanced message-header
CRLF
[ message-body ]

205 —— enhanced start-line = request-line | response-line | event-line

| Message Type | Value 1 | Value 2 | Value 3 | Value 4 |
|---|---|---|---|---|
| Request | Method-Name | En_Request-Id | Prot_Version | N/A |
| Response | Prot_Version | En_Request-Id | Status-Code | Request-State |
| Event | Event-Name | En_Request-Id | Request-State | Prot_Version |

215 —— En_Request-Id = 1*DIGIT
(where 1*DIGIT includes a call identifier & a request reference)

305 —— enhanced message-header = 1*(generic-header | resource-header)

310 —— enhanced header = field-name ":" [ field-value ]

| Field Name | Field Value |
|---|---|
| Media-Input-Identifer | Id-Value |
| Media-Output-Identifer | Id-Value |

320 —— field-value = *( field-content | LWS )
field-content = <the OCTETs making up the field-value
and consisting of either *TEXT or
combinations of token, separators,
and quoted-string>

FIG. 3

ENHANCED MEDIA RESOURCE PROTOCOL MESSAGES

BACKGROUND

1. Field of the Invention

The present invention relates to the field of telecommunications and, more particularly, to an enhanced messaging protocol for controlling media service resources.

2. Description of the Related Art

The Media Resource Control Protocol (MRCP) is a protocol for interfacing with media resources developed by the Internet Engineering Task Force (IETF). The MRCP is designed to provide a mechanism for a client device requiring audio/video stream processing to control processing resources on a network. These media processing resources can include a speech recognizer, such as an automatic speech recognition (ASR) engine, a speech synthesizer, such as a text-to-speech (TTS) engine, a fax, a signal detector, and the like. Further, MRCP allows media processing resources to be utilized by a remotely located system, such as an Interactive Voice Response (IVR) system, a telephone application server, and/or a voice server.

The message format for MRCP is text based with mechanisms to carry embedded binary data. This allows data recognition grammars, recognition results, synthesizer speech markup, and the like to be carried within MRCP messages conveyed between a client and the media resource server.

MRCP addresses the issue of controlling and communicating with the resource processing the stream, and defines the requests, responses, and events needed to do that. The MRCP protocol does not, however, address session control management, media management, reliable sequencing and delivery or server or resource addressing, which are to be handled separately by a protocol like Session Initiation Protocol (SIP) or Real Time Streaming Protocol (RTSP).

Turning to specifics of the MRCP, an MRCP message consists of a start-line, one or more header fields, an empty line indicating the end of the header fields, and an optional message body. An empty line can be represented by a carriage return line feed (CRLF).

| | |
|---|---|
| generic-message = | start-line |
| | message-header |
| | CRLF |
| | [ message-body ] |

The start line can include a request-line, a response-line, and/or an event line. Accordingly, the start line can identify the type of message contained within the MRCP message. The three possible types of messages can include a request message, a response message, and/or an event message.

| | |
|---|---|
| start-line = | request-line | response-line | event-line |

A request message can be conveyed from a client to a server. The request message can include the name of a method to be applied, a space (SP) used as a field separator, a method tag for a request, another SP, and a version of the MRPC protocol in use.

| | |
|---|---|
| request-line = | method-name SP request-id SP mrpc-version CRLF |

After receiving and interpreting a request message, a server resource can respond to the client with a response message. The response message can include a version of the MRPC protocol running on the server, a SP, a request-id that must match that sent in the corresponding request message, a SP, a status-code representing the success, failure, or other of the request, a SP, and a request state field indicating if a job is pending, in-process, or complete.

| | |
|---|---|
| response-line = | mrcp-version SP request-id SP status-code SP quest-state CRLF |

When a server resource needs to communicate a change of state or an occurrence of an event to a client, the server can generate an event message. The event message can include an event name identifying the nature of the event generated by the media resource, a SP, a request-id that matches that sent in the request that caused the event, a SP, a request-state, a SP, and an mrcp-version.

| | |
|---|---|
| event-line = | event-name SP request-id SP request-state SP mrcp-version CRLF |

The message header can include one or more general headers and one or more resource specific headers, where resource specific headers can include request headers and response headers.

| | |
|---|---|
| message-header = | 1*(generic-header | resource-header) |

Each header consists of a field name followed by a colon and an optional field value, where the field name is a token and the field value includes field content that does not include any leading or trailing linear white spaces (LWS). combinations of token, separators,

| | |
|---|---|
| header = | field-name ":" [ field-value ] |
| field-name = | token |
| field-value = | *( field-content | LWS ) |
| field-content = | <the OCTETs making up the field-value and consisting of either *TEXT or combinations of token, separators, and quoted-string> |

When used to as a communication protocol between a telephone application server and/or a componentized voice server, the MRCP has numerous shortcomings. First, MRCP messages do not include information sufficient to reference MRCP messages back to associated telephone calls. Reference back information can be useful to enable end-to-end call tracing features, which can be highly beneficial when conducting debugging operations. Additionally, access to call identity permits a speech engine or other media processing resource to reference call information from call-specific information data stores, such as data stores established by a telephone gateway, a telephone application server, and/or a voice server.

Another shortcoming of the MRCP when used in a telephone application server context is that the MRCP does not include information sufficient to link MRCP messages back to a media gateway, such as a media converting component of a telephone voice server. The MRCP specification includes identification of audio input and output with a focus on a one to one allocation between calls and speech engines.

In other words, the input/output parameters provided by the MRCP focuses on allocating one media resource per call. Once allocated, the resource is occupied for the duration of a call. This type of allocation can be referred to as call-based engine allocation, which can be highly inefficient as it fails to maximize the utilization of speech engines, such as ASR engines and TTS engines.

Cost effective telephony solutions do not allocate speech engines for an entire call. Rather, a speech engine is allocated for a turn of speech, where each turn represents a discrete speech request or work unit that a speech engine is to process. Because MRCP does not specify media sources within messages, utilizing the MRCP protocol for turn-based speech engine allocation can be problematic and establishment of proper communication channels for the dynamically allocated speech engines can result in processing delays.

SUMMARY OF THE INVENTION

The present invention defines a messaging protocol for media resource communication that includes a telephone call identification and/or audio source and sink information in accordance with the inventive arrangements disclosed herein. In one embodiment, the present invention can be an extension of the Media Resource Control Protocol (MRCP). The inclusion of telephone call identification information within media resource control messages permits speech engines to identify a telephone call for which tasks are being performed. This call identification information can enable end-to-end call tracing, can facilitate debugging operations, and can provide a key field for the speech engine to access call specific information stored within numerous data sources. The inclusion of audio source and sink information can provide the speech engine with the information necessary to send and receive media to an appropriate location.

As used herein, MRCP is defined as including MRCP version 5.0 as specified by Shanmugham, et. al. on Jan. 4, 2004, as well as earlier versions of MRCP approximately adhering to the details expressed herein. Further, as used herein, MRCP can include versions subsequent to MRCP version 5.0 as well as derivatives of MRCP version 5.0 and other media protocols that are relatively consistent with MRCP version 5.0. The terms "relatively consistent" are to be determined in accordance with the inventive arrangements disclosed herein and not to be gauged by protocol differences largely irrelevant to this disclosure.

One aspect of the present invention can include a communication system that uses a standardized messaging protocol. The communication system can include a telephony application server and at least one speech engine. The telephony application server can have at least one voice server component. The speech engines can be allocated to handle requests for the voice server component on a per turn basis. The standardized messaging protocol can define a message format for requesting messages sent from the voice server component to a selected speech engine, a message format for response messages sent from the speech engine to the voice server component, and a message format for event messages sent from the speech engine to the voice server component. Each message format can include a field for a call identifier. The standardized messaging protocol can also specify audio Uniform Resource Identifiers (URIs)s for conveying audio signals between the speech engine and a media converting component of the telephone application server.

Another aspect of the present invention can include a messaging protocol for media resources that can include a start line, a message header, and a message body. The start line can specify a message type, such as a request, a response, and/or an event. The start line can also include an identifier for a telephone call. The message header can include a generic-header and/or a resource header. The message body can contain message specific data.

Still another aspect of the present invention can include a messaging protocol for media resources that can include a start line, a message header, and a message body. The start line can specify a message type as well as message identifying data. The message header can include at least one port field for identifying a port to which a media resource is to communicatively link. Audio signals can be communicated across, such a link. The message body can include message specific data.

BRIEF DESCRIPTION OF THE DRAWINGS

There are shown in the drawings, embodiments that are presently preferred; it being understood, however, that the invention is not limited to the precise arrangements and instrumentalities shown.

FIG. 1 is a schematic diagram illustrating a message format for a media resource messaging protocol in accordance with the inventive arrangements disclosed herein.

FIG. 2 is a schematic diagram illustrating a start line for a media resource messaging protocol in accordance with the inventive arrangements disclosed herein.

FIG. 3 is a schematic diagram illustrating a message header for a media resource messaging protocol in accordance with the inventive arrangements disclosed herein.

DETAILED DESCRIPTION OF THE INVENTION

Figure 4:
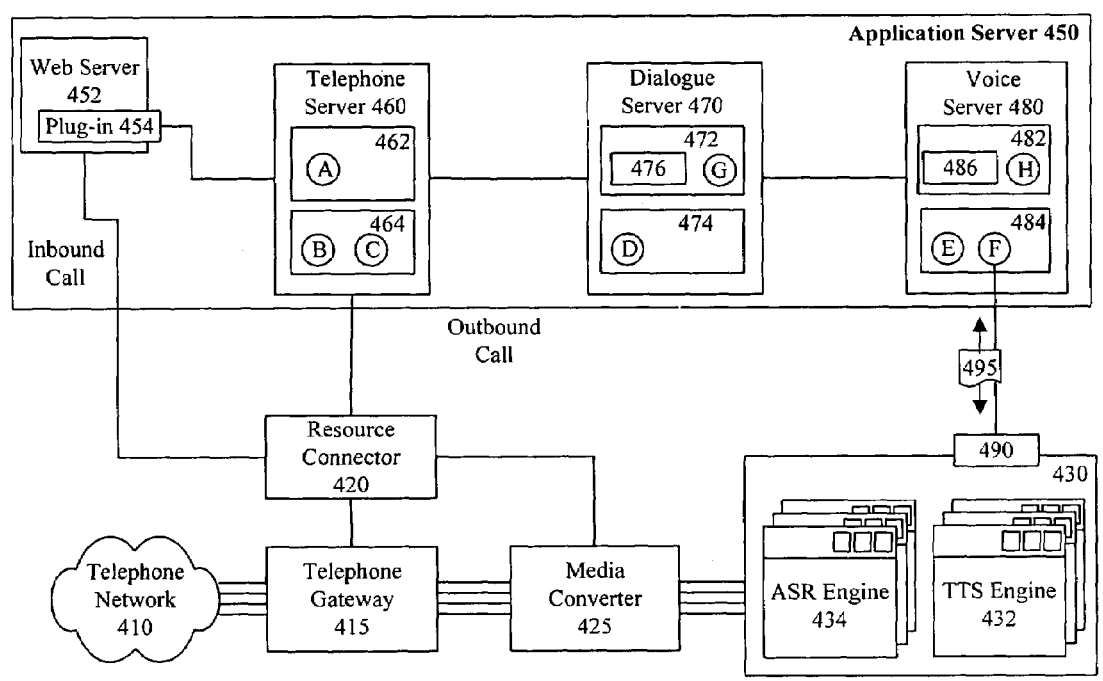
FIG. 4 is a schematic diagram illustrating a system in which messages formatted using the disclosed media resource messaging protocol can be implemented in accordance with the inventive arrangements disclosed herein.

FIG. 1 is a schematic diagram 100 illustrating a message format for a media resource messaging protocol in accordance with the inventive arrangements disclosed herein. The protocol can control media resources like speech synthesizers, recognizers, signal generators, signal detectors, fax servers, and the like over a network. The protocol is designed to work with streaming protocols like real time streaming protocol (RTSP), session initiation protocol (SIP) and the like that help establish control connection to external media streaming devices and media delivery mechanisms, such as a Real Time Protocol (RTP). In one embodiment, the table 100 can be an extension of a Media Resource Control Protocol (MRCP) by the Internet Engineering Task Force (IETF).

Diagram 100 consists of a generic-message 105 to be used for the media resource messaging protocol. The generic message includes an enhanced start-line, an enhanced message-header, a field delimiter, such as a carriage return line feed (CRLF), and an optional message body. The enhanced start line can specify a message type, such as a request, a response, and/or an event. The enhanced start line can include a call identifier, which identifies a telephone number of a call for which the media resource is being requested. The enhanced message header can include a generic header and/or a resource specific header. The enhanced message header can also include an identifier for an audio source and/or an audio sink that a media resource is to utilize. The message body can contain message specific data.

FIG. 2 is a schematic diagram 200 illustrating a start line for a media resource messaging protocol in accordance with the inventive arrangements disclosed herein. The diagram 200 specifies an enhanced start line 205, a message table 210, and an enhanced request identifier 215. The enhanced start line 205 can consist of a request line, a response line, or an event-line.

The message table 210 provides a definition for the request line, the response line, and the event line. A request line defines a format for messages sent from a resource requestor to a media resource server. The request line can include a method name, an enhanced request identifier 215, and a protocol version. The method name can define a method of the media resource that is desired. The enhanced request identifier 215 can uniquely identify a request. All subsequently conveyed messages relating to the original request will include the request identifier 215. The protocol version identifies the version of the protocol.

It should be noted that the enhanced request identifier 215 can include any number of digits. A portion of these digits can identify the call. In one embodiment, the first ten digits of the enhanced request identifier 215 can specify a telephone location and following digits can specify a request reference. The request reference can be a count for the number of request being processed, where a first request can have a request reference of 1, a second request can have a request reference of 2, and so forth.

It should be noted that the telephone location specified within the request identifier 215 is not limited to digits representing a telephone number and that any unique identifier for a telephone location can be used. For example, a telephone location can be identified using a port identifier for a port established by a telephony gateway used for the call. Further, the call identifying data can appear anywhere within the enhanced request identifier 215 and do not necessary proceed the. request reference. For example, the request reference can proceed the call identifier and/or be interspersed with call identifying digits. Moreover, any request reference can be utilized within the enhanced request identifier 215 so long as when the call identifier and the request reference is combined, a unique identification key results.

Referring to the response line shown in message table 210, the response line can define a format for messages conveyed from a media resource server to a resource requestor in response to a request message. The response line can include a protocol version, an enhanced request identifier, a status code, and a request state. The status code can indicate the current state of the request. For example, the status code can include values for success, failure, unknown, and the like. The request state can indicate a processing state for a method executing within a media resource server. For example, the processing state can include values for pending, in-process, complete, and the like.

Referring to the event line shown in message table 210, the event line can define a format for messages conveyed from a media resource server to a resource requestor in response an occurrence of events relating to a request. The event line can include an event name, an enhanced request identifier, a request state, and a protocol version. The event name can include a key that uniquely identifies an event occurring within the media resource server. The enhanced request identifier, the request state, and the protocol versions can be formatted in the same manner as previously detailed within the request line and/or response line.

FIG. 3 is a schematic diagram 300 illustrating a message header for a media resource messaging protocol in accordance with the inventive arrangements disclosed herein. The diagram 300 can include an enhanced message header 305, an enhanced header 310, a port table 315, and field definers 320.

The enhanced header 310 can be a format of at least one type of enhanced message-header 305, where types of enhanced-message headers 305 can include a generic header and/or a resource specific header. The enhanced header 310 can include a field name, a delimiter like a ":", and an optional field value. As shown by the field definers 320, a field value can include multiple field-content values, each separated by a delimiter like a linear white space (LWS). Field-content values can include binary data, textual data, and the like. Binary data can include a plurality of octets. Text can include one or more strings, tokens, keys, separators, and the like.

The port table 315 can define one or more media URIs that the media resource can use to convey media information, where media information can include any form of audio/video information, such as streamed audio signals. The port table 315 can include a media input identifier and a media output identifier. The media input identifier can define a media input source for a media resource. The media output identifier can define a media output source for the media resource.

FIG. 4 is a schematic diagram illustrating a system 400 in which media resources can communicate using a standardized messaging protocol in accordance with the inventive arrangements disclosed herein. The system 400 can include a telephone gateway 415, one or more speech engines 430, and a telephony application server 450.

The telephone gateway 415 can include hardware and/or software that translates protocols and/or routes calls between a telephone network 410, such as a Public Switched Telephone Network (PSTN), and the application server 450. The telephone gateway 415 can route calls using packet-switched as well as circuit switched technologies. Further, the telephone gateway 415 can contain format converting components, data verification components, and the like. For example, the telephone gateway 415 can include a CISCO 2600 series router from Cisco Systems, Inc. of San Jose, Calif., a Cisco, a CISCO 5300 series gateway, a Digital Trunk eXtended Adapter (DTXA), an INTEL DIALOGIC (R) Adaptor from Intel Corporation of Santa Clara, Calif., and the like.

The speech engines 430 can include one or more automatic speech recognition engines 434, one or more text to speech engines 432, and other media resources. Particular ones of the speech engines 430 can include one or more application program interfaces (APIs) for facilitating communications between the speech engine 430 and external components. For example, in one embodiment, the ASR engine 434 can include an IBM ASR engine with an API such as a Speech Manager API (SMAPI).

Selective ones of the speech engines 430 can include a control interface 490 for conveying protocol messages 495, where the details of the protocol messages 495 have been previously specified in FIGS. 1-3 and the corresponding descriptions. In an embodiment where the protocol message 495 is an extension of MRCP, the control interface 490 can be an MRCP engine control interface.

The application server 450 can include an engine that functions as a reliable foundation for handling high volume secure transactions and Web services. In one embodiment, the application server 450 can be a Websphere Application Server (WAS).

The application server 450 can also include a multitude of component servers, such as telephone server 460, dialogue server 470, and voice server 480, communicatively linked via one or more Web servers 452. Each Web server 452 can include one or more. plug-ins 454, where each plug-in 454 can include routines for conveying data to particular component servers within the application server 450. Each of the component servers of the application server 450 can be components implemented within a Virtual Machine, such as virtual machines adhering to the JAVA 2 Enterprise Edition (J2EE) specification or other similar and/or derivative specification.

The telephone server 460 can control the setup, monitoring, and tear down of phone calls. In one arrangement, telephone server 460 can include a web container 462 and an Enterprise Java Beans (EJB) container 464. Moreover, the telephone server 460 can include one or more call control servlets (servlet A), one or more call control EJBs (Bean B), and one or more call control interpreter EJBs (Bean C).

The dialogue server 470 can manage tasks relating to call dialogue for the application server 450. In one arrangement, the dialogue server 470 can include web container 472 and EJB container 474. Moreover, the dialogue server 470 can include one or more voice markup interpreter EJBs (Bean D).

The voice server 480 can handle one or more speech services for the application server 450. In one arrangement, the voice server 480 can include web container 482 and EJB container 484. Moreover, the voice server 480 can include one or more automatic speech recognition (ASR) EJBs (Bean E) as well as one or more text-to-speech EJBs (Bean F). Bean E and Bean F can be interface components, each interfacing with an identified speech engine 430. Further, Bean E and/or Bean F can be constructed to convey protocol messages 495 between the voice server 480 and particular ones of the speech engines 430.

It should be appreciated that the telephone server 460, the dialogue server 470, and the voice server 480 can be arranged in a multitude of fashions and that the invention is not to be limited to the illustrative arrangement presented herein.

The system 400 can also include a media converter 425 and a resource connector 420. The media converter 425 can be a communication intermediary for streaming speech data configured to resolve protocol issues between the telephone gateway 415 and speech engines 430. Audio data can be streamed bi-directionally between the telephone gateway 415 and the speech engines 430 as appropriate.

The resource connector 420 can be a communication intermediary between the telephone gateway 415 and the application server 450 and/or media converter 425 that allocates resources for calls. In one embodiment, the resource connector 420 can normalize a telephony request into a request that is acceptable by the application server 450, thereby providing a generic means for the telephone gateway 415 to interface with the application server 450. For example, if the application server 450 communicates using HyperText Transfer Protocol (HTTP) messages, the resource connector 420 can convert a telephony request into an appropriate HTTP message. In another example, if the application server 450 utilizes a Session Initiation Protocol (SIP), the resource connector 420 can convert a telephony request into an appropriate SIP message.

In operation, a user can initiate a telephone call. The call can be conveyed through a telephone network 410, such as a Public Switched Telephone Network (PSTN), and can be received by the telephone gateway 415. The telephone gateway 415 can convey call information to the resource connector 420. The resource connector 420 can initialize the media converter 425, which can establish one or more media ports that can be used for the call. Identifiers, which can include media Uniform Resource Identifiers (URI), associated with the reserved media ports can be conveyed to the resource connector 420. Notably, a media URI can identify a hostname and protocol for the associated media port. The resource connector 420 can convey call identifying information as well as the media URI to the application server 450.

Speech services can be triggered within the application server 450 as appropriate. Speech services can require one or more speech engines 430 to perform one or more tasks. The speech engines 430 can be allocated on a turn basis to handle the tasks as need arises.

Each task can be initiated by conveying a request protocol message 495 from the application server 450 to a selected speech engine 430. The request message 495 can include a call identifier and/or the media URIs that have been established for the call. The selected speech engine 430 can connect to the media converter 425 using the media URIs. Additionally, call information, based upon the call-identifier, can be retrieved from the application server 450, telephone gateway 415, media converter 425, and other system 400 components. The selected speech engine 430 can process the request as appropriate. Processing the request can involve direct communications between the speech engine 430 and the media converter 425 that are not routed through the application server 450.

Once processed, a response protocol message 495 can be conveyed from the speech engine 430 to the application server 450. The speech engine 430 can also convey one or more event messages 495 to the application server 450 to signify the occurrence of defined events. The application server 450 can take appropriate actions responsive to the receipt of response messages 495 and/or event messages 495. For example, if a response message 495 indicates that a corresponding event failed to process correctly, the application server 450 can re-initiate the request.

It should be noted that conveying the media URI and/or call identifying information to the speech engine 430 along with a request facilitates turn based processing of tasks. That is, a dynamically allocated speech engine 430 receives the information necessary to handle the request (i.e. the media URI and the call identifying information) when it receives the request. The speech engine 430 need not query the telephone gateway 415, resource connector 420, the media converter 425, or any application server 400 component to retrieve necessary data for processing the request. Accordingly, bottlenecks and latencies associated with communicating. through the application server 400 can be avoided when utilizing the techniques disclosed herein.

It should be appreciated, that FIG. 4 is just one illustrative embodiment in which the protocol messages 495 can be utilized. Accordingly, the subject matter disclosed herein can be utilized in conjunction with any system where messages are communicated between a media processing resource and a remote component.

The present invention can be realized in hardware, software, or a combination of hardware and software. The present invention can be realized in a centralized fashion in one computer system or in a distributed fashion where different elements are spread across several interconnected computer systems. Any kind of computer system or other apparatus adapted for carrying out the methods described herein is suited. A typical combination of hardware and software can be a general-purpose computer system with a computer program that, when being loaded and executed, controls the computer system such that it carries out the methods described herein.

The present invention also can be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention can be embodied in other forms without departing from the spirit or essential attributes thereof. Accordingly, reference should be made to the following claims, rather than to the foregoing specification, as indicating the scope of the invention.

What is claimed is:

1. A method for controlling, and communicating with, media processing resources, the method comprising:
    providing a system that requests services from at least one of the media processing resources, the system being remotely located from the media processing resources;
    providing a messaging protocol for interfacing the system with the media processing resources; and
    allocating the media processing resources on a per-turn basis, wherein each turn represents a discrete speech request or work unit that a media processing resource is to process;
    wherein the messaging protocol defines a message format for requesting messages sent from the system to the media processing resources, a message format for response messages sent from the media processing resources to the system, and a message format for event messages sent from the media processing resources to the system;
    wherein each message format includes a start-line, a message header, a field delimiter indicating an end of the message header, and an optional message body;
    wherein the start-line specifies a message type and includes a call identifier that identifies a telephone number of a call requesting a media processing resource; and
    wherein the message header includes an identifier for identifying a media input and/or output source for a media processing resource.

2. The method of claim 1, wherein the system is one among an interactive Voice Response (IVR) system, a telephone application server, or a voice server.

3. The method of claim 1, wherein the messaging protocol conforms to standards of a Media Resource Control Protocol (MRCP).

4. The method of claim 1, wherein the messaging protocol specifies a request identifier that uniquely identifies a request, said request identifier including the call identifier.

5. The method of claim 1, wherein the messaging header includes a field for identifying a media Uniform Resource Identifier (URI) associated with a media port.

* * * * *